United States Patent [19]
Park et al.

[11] Patent Number: 5,478,911
[45] Date of Patent: Dec. 26, 1995

[54] PROCESS FOR THE PREPARATION OF A POLYESTER USING AN ANTIMONY-ESTERIFIED TRIMELLITATE CATALYST

[75] Inventors: Sang-Bong Park, Daegu; Woo Choi, Pusan; Byeong-Il Lee, Kyunggi, all of Rep. of Korea

[73] Assignee: Kolon Industries Inc., Seoul, Rep. of Korea

[21] Appl. No.: 356,717

[22] Filed: Dec. 15, 1994

[30] Foreign Application Priority Data

Dec. 30, 1993 [KR] Rep. of Korea .................. 93-31500
Dec. 30, 1993 [KR] Rep. of Korea .................. 93-31502

[51] Int. Cl.$^6$ ............................................ C08G 63/78
[52] U.S. Cl. .................. 528/285; 502/150; 502/157; 528/272; 528/275
[58] Field of Search ............................ 502/157, 150; 528/285, 275, 272

[56] References Cited

U.S. PATENT DOCUMENTS 4,975,513  12/1990  Kim et al. ............................. 528/45

*Primary Examiner*—James J. Seidleck
*Assistant Examiner*—Terressa Mosley
*Attorney, Agent, or Firm*—Oblon, Spivak, McClelland, Maier & Neustadt

[57] ABSTRACT

A linear, highly polymerized polyester is prepared by polycondensing a glycol ester of aromatic dicarboxylic acid and/or a low molecular weight condensate thereof by using as polycondensation catalyst a preformed antimony compound which is obtained from the reaction of esterified trimellitate with an antimony compound selected from a member of antimony halide, antimony carbyxylate and antimony carbyxylate. The above-mentioned esterified trimellitate is prepared by reacting trimellitic acid or trimellitic anhydride with alcohols such as alkyl alcohol or alkane diol and treating successively organic or inorganic base with the resultant reaction product, and comprises, depending on the type of alcohol used, a mixture of 1-alkoxycarbonyl-2,4-benzenedicarboxylate and 2-alkoxycarbonyl-1,4-benzenedicarboxylate or a mixture of 1-(hydroxyalkoxycarbonyl)-2,4-benzenedicarboxylate and as a main 2-(hydroxyalkoxycarbonyl)-1,4-benzenedicarboxylate component. A high quality polyester having a low content of terminal carboxyl group and diethylene glycol group, an excellent color tone and a high melting point may be prepared by using preformed antimony compound in a short polycondensation time.

15 Claims, No Drawings

PROCESS FOR THE PREPARATION OF A POLYESTER USING AN ANTIMONY-ESTERIFIED TRIMELLITATE CATALYST

FIELD OF THE INVENTION

The present invention relates to a process for the preparation of polyester. More particularly, this invention relates to a process for the preparation of substantially linear, highly polymerized polyester having a high melting point and an excellent color tone in a short reaction time by using preformed antimony compounds as a polycondensation catalyst.

BACKGROUND OF THE INVENTION

Polyester, particularly polyethylene terephthalate made from an aromatic dicarboxylic acid and glycol, being industrially produced in the present time are widely used in fibers, films, moulding materials and the like due to remarkable mechanical, physical and chemical properties thereof. Polyethylene terephthalate is produced industrially by the process which comprises heating bis($\alpha$-hydroxyethyl) terephthalate and/or a low molecular weight condensate thereof(referred to the esterified products hereinafter) together with a polycondensation catalyst at a temperature of 260° to 300° under reduced pressure to effect polycondensation. Bis($\beta$-hydroxyethyl) terephthalate and/or low molecular weight condensate can be obtained by the direct esterification which consists of heating terephthalic acid and ethylene glycol at a temperature of 200° to 280° C. under atmospheric pressure or increased pressure, or the ester-exchange reaction which consists of heating dimethyl terephthalate and ethylene glycol at a temperature of 140° to 240° C. in the presence of a catalyst (referred to TPA method and DMT method hereinafter, respectively).

In general, a polycondensation catalyst has been used to develop easily a polycondesation when producing polyester in a commercial scale. The polycondensation catalysts include metal compounds such as antimony, titanium, germanium, tin, zinc, manganese or lead compound, and they effect significantly polycondensation rate and a quality of the obtained polyester, since a polycondensation is carried out at a high temperature for a long time in the presence of metal compound catalysts. The polyester having a high polymerization degree is obtained easily by these catalyst, whereas the unfavorable side effects are accompanied by the catalyst result with the problem to color the obtained polymer yellow or gray, or to deteriorate its physical properties as lowering a melting point and strength when increasing the content of diethylene glycol(DEC) and terminal carboxyl group(COOH) over an appropriate level.

Therefore, a process for the preparation of polyester having excellent physical properties and a good color tone for a short period of reaction time is very essential in the productivity and the quality of products.

With regard to the above facts, the most widely used polycondensation catalysts for the preparation of polyester in the industry include antimony compounds and germanium compounds, especially antimony trioxide and germanium dioxide.

Antimony trioxide is effective in cost, its catalytic activity in a polycondensation is relatively high and its side effects are not serious, while since it hardly dissolves in ethylene glycol or the reaction mixture and tends to precipitate during the reaction, the finally obtained polyester may have undesirable orange-green or gray tone, or appear reduced clarity.

In case of germanium dioxide, the side effects may be reduced a little, whereas a polymerization time may be lengthened due to the lower catalytic activity of germanium dioxide than that of antimony trioxide.

Side effects and coloring should be careful since they have a bad influence on the quality of the resulting polyester. To increase an amount of catalyst or elevate a reaction temperature in order to shorten a polycondensation time and to enlarge the productivity, the problems such as side effects and coloring become remarkable.

Many methods to improve the known problems above have been suggested for reducing a reaction time by a catalyst and for producing polyester having excellent physical properties and a good color. However, the proper method is hardly found.

For increasing a polycondensation rate, a method using a reaction of silicone compound with titanium compound is described in U.S. Pat. No. 3,927,052, a method using germanium compound together with titanium compound in UK patent No.949,085, a method using a mixture of antimony trioxide, cobalt compounds and phosphine compounds dissolved in ethylene glycol in JP patent Laid-Open No. 51295/1978 and a method using a reaction product of titanium compounds and an organic acid in U.S. Pat. No. 4,131,601. However, in accordance with these methods the color of the resulting polymer appears pale-yellow, or many problems happen to the physical properties thereof due to an increase of the content of diethylene glycol and terminal carboxyl group.

In order to improve a color of the polymer, JP patent publication No. 28119/1972 discloses a method using cobalt compounds as a color-improving agent, particularly using it together with titanium compound, JP patent Laid-Open No. 73827/1990 does a method using cobalt compound with a mixed catalyst of antimony and tin, and JP patent Laid-Open No. 117216/1983 does a method using cobalt compounds and alkali metal compounds with antimony compounds. However, the above methods are not able to improve both a color and clarity and physical properties of the polymers at a same time.

As mentioned above, although a number of studies have been done to resolve the problems of the prior art, they do not satisfy the reduction of the polycondensation time, the inhibition from coloring and the improvement of the decrease of physical properties, simultaneously.

SUMMARY OF THE INVENTION

The present inventors have extensively studied on a process for the preparation of polyester having an excellent color tone, high quality, a high melting point, and a low concentration of diethylene glycol and terminal carboxyl group, of which polycondensation time is shortened. As a result, we have accomplished the purpose of the present invention as using the preformed antimony compound.

It is an object of the present invention to provide a process for preparing polyester from glycol ester of an aromatic dicarboxylic acid and/or a low molecular weight condensate in the presence of the preformed antimony compound as a polycondensation catalyst.

Also it is another object of the present invention to provide a process for producing a highly qualified of polyester having an excellent color and a high melting point in a short reaction time.

DETAILED DESCRIPTION OF THE INVENTION

In particular, the present invention relates to a process which comprises obtaining the esterified products containing bis(β-hydroxyethyl) terephthalate and/or a low molecular weight condensate as a main component, either by the direct esterification of terephthalic acid alone or dicarboxylic acids having terephthalic acid as a main component or their derivatives with ethylene glycol or glycols having ethylene glycol as a main component or their derivatives, or by the ester-exchange reaction of dimethyl terephthalate, dialkyl terephthalate having dimethyl terephthalate as a main component, their isomers or their derivatives thereof with ethylene glycol or glycols having ethylene glycol as a main component or their derivatives, and polycondensing successively the esterified product obtained to produce polyester; wherein the process is characterized by using the preformed antimony compound as a polycondensation catalyst, which is prepared by the reaction of antimony compound with esterified trimellitate resulted from the base treatment of the reaction mixture of trimellitic anhydride and alkyl alcohol or alkane diol. The preformed antimony compound, according to the present invention, can shorten a polycondensation time without increasing the side effects.

The dicarboxylic acids used in the present invention include aromatic, aliphatic and cycloaliphatic dicarboxylic acids such as terephthalic acid, isophthalic acid, naphthalene-2,6-dicarboxylic acid, diphenyl-4,4'-dicarboxylic acid, diphenylsulfone-4,4'-dicarboxylic acid, diphenylmethane-4,4'-dicarboxylic acid, diphenylether-4,4'-dicarboxylic acid, diphenoxy-ethane-4,4'-dicarboxylic acid, malonic acid, succinic acid, glutaric acid, adipic acid, azelaic acid, sebacic acid, cyclohexanedicarboxylic acid or decanedicarboxylic acid and their ester derivatives thereof such as methyl ester, ethyl ester or phenyl ester.

The glycols used in the present invention include aromatic, aliphatic and cycloaliphatic diol such as ethylene glycol, trimethylene glycol, tetramethylene glycol, hexamethylene glycol, cyclohexane-1,4-dimethano 1,4-cyclohexanediol, bisphenol A, bisphenol S, bis(hydroxyethoxy) bisphenol A or tetrabromo bisphenol A.

to the present invent ion may also be applied to produce copolyester having the third component except for the above components, however the content of the third component is preferable not to exceed 40% by mole.

Bis(β-hydroxyethyl) terephthalate and/or a low molecular weight condensate(a polymerization degree of 2 to 10) may be produced either by the direct esterification of an aromatic dicarboxylic acid and glycol, or by the ester-exchange reaction of a lower alkyl(having a carbon atom of 1 to 4) or phenyl ester of aromatic dicarboxylic acid with glycol, or by the reaction of an aromatic dicarboxylic acid with derivatives capable of forming glycol ester, such as 1,2-epoxide of glycol.

The glycol ester of dicarboxylic acid and a low molecular weight condensate thereof may be obtained in the presence of catalyst used to an esterification or an ester-exchange reaction, which includes acetates and hydroxides selected from the group consisting of Li, Na, Mg, Ca, Co, Mn, Zn and the like.

The polycondensation catalyst containing the preformed antimony compound as a main component is used in polycondensing further the esterified products containing bis(β-hydroxyethyl) terephthalate and/or a low molecular weight condensate thereof as a main component, and the preformed antimony compound is the reation product of antimony compound and esterified trimellitate.

The antimony compound can be represented by the following formula(I); and includes antimony halide such as antimony trichloride, antimony tribromide or antimony trifluoride, antimony carboxytate such as antimony triacetate, antimony tristearate, antimony tribenzoate, antimony tri(2-ethylhexenoate), or antimony trioctoate, and antimony alkoxide compound such as antimony trimethoxide, antimony ethylene glycoxide, antimony triisopropoxide, antimony tri(n-butoxide) or antimony triphenoxide. Particularly, antimony halide such as antimony trichloride is preferable.

The esterified trimellitate is represented by the formulas (II):

(II)

$$(M^+{}_2 \text{ or } M^{++}) \cdot \left[ \begin{array}{c} \text{structure} \end{array} \right]$$

Multifunctional cross-linking agent in the present invention may include trimellitic acid, trimesic acid, pyromellitic acid, trimethylol propane, glycerin, pentaerythritol. And monofunctional end group-terminator may include monomethoxy polyethylene glycol, stearyl alcohol, palmitic acid, benzoic acid, naphthoic acid.

In preparing polyester according to the present invention, it is preferable to react dicarboxylic acid containing terephthalic acid or dimethyl terephthalate methyl ester derivative of dicarboxylic acid containing dimethyl terephthalate as a main component with ethylene glycol or diol containing ethylene glycol as a main component. The process according wherein M⁺ is an alkali metal cation such as Li, Na or K, an organic amine cation such as ammonium, trimethyl ammonium or triethyl ammonium;

M⁺⁺ is an alkaline earth metal cation such as Mg, Ca;

R is aliphatic or cycloaliphatic alkylene, arylene group, or their derivatives, and preferably aliphatic alkylene group which can be represented by the formula (III),

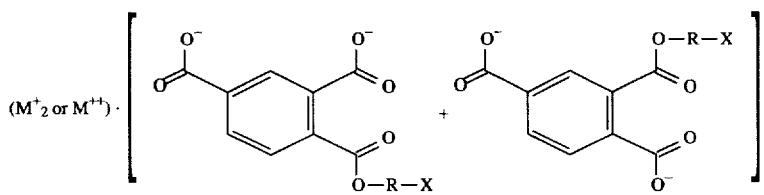

(III)

wherein as aliphatic alkylene group is preferably polymethylene group having n of 1 to 18.

The esterified trimellitate of the formula (II) is obtained either by reacting a metal hydroxide or organic amine with the ester derivatives of trimellitic acid obtained by the partial esterification of trimellitic acid with alkyl alcohol or alkane diol in the presence of a catalyst, or by the treatment with a metal hydroxide or an organic base of the ester derivatives of trimellitic acid containing monoesterified trimellitic acid as a main component, which is esterified by the ring-opening reaction of trimellitic anhydride and an alcohol or alkane diol. The solvent is not required additionally because the alcohol (such as methanol or ethylene glycol) to bind to an ester group is used as both a reactant and a solvent.

When producing the monoesterified trimellitic acid and then converting the same to a corresponding metal carboxylate, the lower a solubility of metal hydroxide is if the larger a molecular weight of an alcohol is, namely the smaller a polarity of a solvent is. Therefore, distilled water should be added to the reaction mixture.

The preformed antimony compound used as a polycondensation catalyst in the present invention is prepared by the reaction of the antimony compound of the above formula(I) with the esterified trimellitate as it is without separation. In case of using the same as a catalyst, the reaction mixture is precipitated in a precipitating agent like acetone, recovered, washed and dried to be obtained powder, and thereafter the slurry or solution of the resulting powder in ethylene glycol may be put into the reaction vessel for the preparation of polyester according to the present invention.

In preparing the preformed antimony compound, the esterification being the first step is preferable to use methanol as an alcohol and ethylene glycol as an alkane diol. Further the esterification is preferably carried out by heating trimellitic acid anhydride together with an alcohol or alkane diol.

The second step comprising the conversion into carboxylate(esterified trimellitate) is preferable to use an alkali metal hydroxide like LiOH as a base, and the third step for producing preformed antimony compound is preferable to use antimony halide like antimony trichloride as an antimony compound.

The preformed antimony compound obtained may have a difference in the contents of antimony, unsubstituted group of antimony compound(e.g., chlorine of antimony trichloride) and unsubstituted metal of monoesterified trimellitate(e.g., Li of monoesterified Li dicarboxylate) in accordance with the reaction condition of a reaction time, a scale, a temperature, molar ratio and the like, and may exist as a hydrate form.

A process for preparing the preformed antimony compound of the present invention is described in detail as follows: The process consists of reacting trimellitic arthydride with an exceed amount of methanol for about 1–5 hours with heating to a boiling point of methanol to be a clear solution which, as a major product, contains a mixture of 1-methoxycarbonyl-2,4-benzene dicarboxylic acid and 2-methoxycarbonyl-1,4-benzene dicarboxylic acid depending on an attacking position of methanol against anhydride group, successively adding a metal hydroxide such as LiOH to the resulting mixture without separation, to be prepared esterified Li trimellitate having $Li^+$ ion as $M^+$ of the formula (II).

Then, to said reaction mixture unseperated is added directly antimony compound like antimony trichloride dissolved apart in methanol used as a reaction solvent at a room temperature, resulting in precipitate. The resulting mixture is stirred enough, poured into an excess of acetone, allowed it to stand overnight, filtered, washed several times with acetone and dried.

The reaction products are isolated from the solvent in each process and then infrared spectrum thereof is recorded in order to identify the progress of each process of the reaction. As a result, infrared absorption peaks due to anhydride group of trimellitic anhydride which is used as a starting material in the first reaction of trimellitic anhydride with methanol show doublet in 1864 and 1779cm$^-$. Thereafter, the absorption peaks by an anhydride disappear in infrared spectrum of the esterified trimellitic acid of the reaction products and the peak due to methoxy carbonyl group, i.e., methyl ester group is newly observed in 1739cm$^-$$_1$. The absorption peak of methyl ester group is shifted to 1716cm$^{-1}$ in the infrared spectrum of the esterified Li trimellitate produced by the salt formation of an esterified dicarboxylic acid with LiOH.

In the infrared spectrum of the preformed antimony compound being the reaction product of the esterified Li trimellitate and antimony trichloride, the absorption peak due to methoxy carbonyl ester group is observed between 1700 and 1725 cm$^-$ depending on the reaction condition such as the molar ratio between the reactants, the reaction scale or the concentration of the reactants to the solvent, and the drying condition of the final product.

Of the conventional antimony compound, antimony trioxide which has been mainly used for producing polyester in a commercial scale tends to precipitate when allowed the same dissolved in ethylene glycol to stand for extended times at room temperature, and antimony may lose catalytic activity by the hydrolysis in the presence of moisture. However, since the preformed antimony compound catalyst of the present invention is a solid phase of powder form, a possibility of degeneration is less in spit of the long reservation. Especially, in case of the composition capable of dissolving in ethylene glycol at a room temperature, it has a very high stability enough not to precipitate even when allowing it to stand for a long time at a room temperature. The preformed antimony compound catalyst according to the present invention has a solubility to ethylene glycol of at least 5% by weight at a room temperature because of having more excellent solubility if a content of antimony becomes lowered. Moreover the preformed antimony compound catalyst of the present invention is characterized by the solubility to ethylene glycol of at least 5% by weight at a temperature of over 120° C. even though the solubility thereto drops somewhat due to a high content of antimony. However, adding a small amount of tetraethyl ammonium hydroxide to ethylene glycol can be obtained a solubility of at least 5% by weight at a room temperature in all cases.

Antimony trioxide being widely used as a catalyst for polyester-polycondensing in a world-wide is dispersed in ethylene glycol to be 5–10% by weight, and then put into the reaction system. However, since catalyst particles can effectively show their catalytic activity only after they disperse and dissolve uniformly into the reaction system, a polycondensation time may be shortened if the dispersing and dissolving term can be reduced. In other words, it is very important for a polycondensation catalyst to be soluble in ethylene glycol, since a polycondensation time is reduced if a polycondensation catalyst is dissolved uniformly in ethylene glycol and their activity is effected immediately in a molecular level after put into a reaction system.

According to the present invention, the preformed antimony compound having an excellent solubility to ethylene glycol can reduce a polycondensation time.

The preformed antimony compound of the present invention revealed an excellent activity as a polycondensation catalyst in any state such of solution or slurry in ethylene glycol, since it also has a good solubility to ester compounds as well as ethylene glycol, bis(β-hydroxyethyl) terephthalate and/or a low molecular weight condensate which are obtained by the direct esterification of the TPA method and the ester-exchange reaction of the DMT method. In the DMT method the preformed catalyst of the present invention may be added in the middle or to the beginning of the ester-exchange reaction, and preferably to just before the polycondensation starts after the ester-exchange reaction in order to avoid forming big particles. In the TPA method the catalyst should be added after the direct esterification for the same reason.

In the preparation of the preformed antimony compound by the reaction of a partially esterified trimellitate of the formula (II) with an antimony compound like antimony trichloride, the molar ratio of antimony compound to said esterified trimellitate having formula (III) anhydride is in the range of between 0.25 to 1 mole and 1 mole, and preferably between 0.3 to 0.7 mole and 1 mole.

The amount of the preformed catalyst to be used is not limited, but it should be used an appropriate amount so as to represent sufficiently catalytic activity depending on each reaction condition.

The preformed antimony compound is used for resulting in containing an antimony of 50 to 1,500ppm on the basis of the finally obtained polyester polymer, and preferably 80 to 1,000 ppm.

It is difficult to obtain a polycondensed polyester having a high polymerizing degree if the content of catalyst is too low and thereby the content of antimony is less than 50 ppm. Further the polycondensing time is governed by a eliminating rate of glycol component forming for the polycondensation although the coloring of polyester hardly appears supposing the content of catalyst to be too high.

According to the present invention, a half or a part of the preformed catalyst may be replaced by conventional polycondensation catalyst, like antimony trioxide, germanium dioxide, germanium tetraoxide, maganese acetate or zinc acetate, the substantial effect of the present invention being able to be maintained.

Polyester can be made from glycol ester of an aromatic dicarboxylic acid and/or a low molecular weight condensate thereof by the conventional polycondensation process, in accordance with the process of the present invention.

In one embodiment of the present invention, the process for preparing polyester consists of heating dialkyl terephthalate and about 2 times of ethylene glycol by mole thereto to a temperature of 130° to 250° C. in the presence of the ester-exchange catalyst like magnesium acetate, carrying out the ester-exchange reaction eliminating a lower alcohol for 1 to 4 hours under atmospheric pressure to produce bis(β-hydroxyethyl) terephthalate and its a low molecular weight condensate thereof (the ester-exchange reaction), heating successively the resulting esterified products to a temperature of 260° to 300° C. in the presence of the above polycondensation catalyst with eliminating the forming ethylene glycol for 1 to 5 hours under pressure of 0.1 to 30 Torr to result in polyethylene terephthalate.

In another embodiment of the present invention, polyethylene terephthalate may be obtained by the same method as mentioned in the above, except for preparing bis(β-hydroxyethyl) terephthalate and/or a low molecular weight condensate thereof through the direct esterification which comprises heating terephthalic acid and ethylene glycol to a temperature of 200°–280° under atmospheric or given pressure with eliminating the resulting water for about 1 to 4 hours.

Furthermore, in the process for preparing polyester according to the present invention, the above-mentioned multi-functional cross-linking agent and mono-functional end group terminator as well as coloring agents such as carbon black, pigments, dyes, quenching agents such as titanium dioxide, phosphorous compounds, ultraviolet stabilizers, antioxidants, diethylene glycol production inhibitors such as lithium acetate and sodium acetate, flame retardents, nucleating agents such as silica or alumina, fluorescent brightening agent, antistatic agents, and the like may be included to the reaction mixtures at any step of the reaction.

Then, the phosphorus compounds which are generally used as a heat stabilizer may be added in the preparation of polyester, and examples of the phosphorus compounds include phosphoric acid, phosphorous acid, methaphosphoric acid, trimethylphosphate triethylphosphate, triphenylphosphate, trioctylphosphate, dimethyl phosphite, diethylphosphite, triphenylphosphire, dioctylphosphire, trimethylphosphite, triethylphosphite, triphenylphosphite, and the like.

Examples of the antioxidants may include Irganox 1010, irganox 1222, Irganox 1076 and Irganox 1098 (trade name: made by Ciba-Geigy Ltd.) which are phenolic antioxidants.

As previously described, in case that the present invention is compared with prior techniques, the polycondensation reaction time for the preparation of polyester may be reduced, and the polymer obtained has an excellent color, and what is more, has a high melting point. In particularly, according to the present invention, a high quality polyester which has a low concentration of diethylene glycol and terminal carboxyl group may be obtained by the using of a specific polycondensation catalyst which has a storage stability for a long time and thereby can be conveniently used in the process.

Now, the present invention will be described in detail in reference to examples. The following examples will serve further to illustrate the present invention but they are not intended to limit the scope thereof.

Unless otherwise stated, all "parts" in the following examples mean "parts by weight".

The wording "reaction time" herein used is intended a polycondensation reaction time, until the reaction is completed, at high vacuum excepting the reduced pressure time between the room pressure and 0.8 to 0.9 Torr of high vacuum in the polycondensation reaction.

A various physical properties mentioned in the following Examples are measured and defined as follows:

1. Limiting Viscosity

Limiting viscosity [η] is measured at the temperature of 25° C. and a orthochlorophenol solution by the following equation.

$$\eta_{sp}/C = [\eta] + K\,[\eta]^2\,C$$

Wherein, $\eta_{sp}$=(viscosity of solution/viscosity of solvent )−1, C. is a weight of the polymer being dissolved per 100 ml of the solvent, and k is Huggins' constant(0.343).

2. Color Tone

A color tone was expressed by L values and b values which were measured by a colorimeter. These values was obtained by measuring the polyester chip which was prepared by extruding a polymerized polyester obtained as a result of polycondensation reaction into a cooling water through a nozzle which was placed at the bottom of reaction vessel to form a spaghetti structure and cutting it into a regular size.

The L and b values thus obtained represents a criterion of the coloring intensity such as brightness and yellowness of the each polyester, and the higher L value and the smaller b value is, the better is the color.

3. Concentration of Terminal Carboxyl Group(COOH)

The obtained polyester chips were dried in a vacuum oven for 3 hours at the temperature of 60° C. under a reduced pressure of 1 Torr, followed by dissolving polyester chips in orthocresol at a concentration of 4 g/dl with heating to a temperature of 100° C., whereby the solution thus obtained was titrated with 0.04N of sodium hydroxide solution to estimate the concentration of the terminal carboxyl group.

4. Melting Point

The melting point of polyester obtained was measured by DSC 7 Series Differential Scanning Colorimeter(made by Perkin-Elmer Ltd.). Namely, as the example of concentration measurement of the terminal carboxyl groups as described in the item 3, the resulting polyester chip was dried, and about 10 mg of the sample was taken out, followed by placing into an aluminum sample fan, and the temperature of the fan was quickly raised up to 280°C.

After holding polyester sample at this temperature for 7 minutes, the sample was quenched by quick dropping of temperature up to −70° C. with a coolant, and the measurement was carried out by raising temperature at a rate of 20° C. per minutes from room temperature to 300°.

The highest peak point of the endothermic peak on the DSC thermogram thus obtained was designated as the melting point.

5. Content of Diethylene Glycol(DEC):

As the example of concentration measurement of the terminal carboxyl groups as described in the item 3, the obtained polyester chip was dried, and 1 g of the sample was taken out. Afterward, the sample was introduced into the closed vessel together with 30 ml of methanol in the presence of a small amount of zinc acetate catalyst, followed by heating at an ambient temperature of 210° C. for 3 hours. The content of DEG was evaluated by chromatography using VISTA 6000 Model(trade name: made by Varian Ltd. in U.S.A.), and depended upon a melting point, therefore, the lower the content of DEG is, the higher is meting point.

6. Infrared Spectrum:

Infrared spectrum was taken by KBr Pellet method using FT-IR( trade name "FTS-40 model": made by Digilab Ltd. in U.S.A.)

EXAMPLES 1 to 4 COMPARATIVE EXAMPLE 1

A. Preparation of polycondensation catalyst 19.2 parts(0.1 mol) of trimellitic anhydride and 130 parts of methanol were added to a round-bottomed flask and refluxed the reaction mixture by heating, with stirring for 5 hours. Then, after the reaction mixture was allowed to cool to a room temperature, 8.4 parts of lithium hydroxide was added to the reaction mixture, and the reaction mixture was further stirred for about 30 minutes on a water bath.

Introducing into the reaction mixture a solution which was prepared separately by dissolving 7.5 parts(0.033 mol) of antimony chloride in 20 parts of methanol at room temperature, a precipitate occurred on the bottom of flask.

The reaction mixture was further stirred for about 30 minutes, followed by pouring it into the excess of acetone, and the reaction mixture thus obtained was stayed overnight, and the precipitated antimony compound was filatered from the mother liquor.

The solid reaction product obtained above was washed with acetone, and dried overnight at 68° C. in an vacuum oven under a reduced pressure.

An absorption peak due to the methyl ester group observed by the infrared spectroscopy was in 1708 cm⁻. By the element analysis, it was found that the content of antimony and lithium were 21.76 and 2.34% by weight, respectively.

B. Preparation of Polyester

A reaction vessel fitted with a stirrer and a rectifying column were charged with 800 parts of dimethyl terephthalate, 500 parts of ethylene glycol and 1.057 parts of magnesium acetate [Mg(CH$_3$COO)$_2$·4H$_2$O] .

The ester-exchange reaction was carried out by heating the mixture for about 130 to 140 minutes raising the temperature from 140° to 230°, while removing methanol formed. After about 230 parts of methanol was removed, followed by adding a solution of 5.36 parts of trimethylphosphate dissolved in 10% by weight in ethylene glycol therein, and stirring was continued for 10 minutes.

Separately, a solution of the predetermined amount of catalyst obtained from the step (A) dissolved in 5% by weight in ethylene glycol was prepared so that the content of antimony in the resulting polyester may be 48 to 380 ppm as shown in Table 1.

The solution prepared was then added to the reaction mixture, followed by stirring the reaction mixture for about 10 minutes, and the reaction temperature was slowly raised from 230° C. up to 285° C. corresponding to the final temperature, while reducing the pressure for 60 minutes, whereby 0.8 to 0.9 Torr of high vacuum was finally obtained.

Afterward, the polycondensation reaction was continued under that reduced pressure, and when the viscosity of the reaction mixture was reached at any desired level, the reaction was completed. Next, the reaction mixture was extruded into a cooling water through a nozzle which is placed at the bottom of the reaction vessel to form spaghetti structure, followed by cutting it into a regular size, whereby the resulting polymer was obtained in the form of chip.

The results of the polymerization reaction time corresponding to the each content of the polycondensation catalyst and the physical properties of the resulting polyester are set forth in Table 1.

In case of Comparative Example 1, the content of catalyst was so low that high polymerization degree couldn't be obtained in a short time.

EXAMPLES 5 to 8

A. Preparation of Polycondensation Catalyst

The same procedure as was set forth in the step (A) of Examples 1 to 4 and Comparative Example 1 was followed in the preparation of the polymerization catalyst except for the use of a solution in which 15.3 parts of antimony trichloride was dissolved in 40 parts of methanol.

According to the infrared spectrum, the absorption peak due to the methyl ester group of the obtained product was observed in 1,709 cm$^{-1}$. By the element analysis, it was found that the content of antimony and lithium was 48.46% by weight and 9,250 ppm, respectively.

B. Preparation of Polyester

The same procedure as described in the step (B) of Examples 1 to 4 and Comparative Example 1 was repeated with the exception that the predetermined amount of the polycondensation catalyst obtained from the step (A) was dispersed in 5% by weight in ethylene glycol, and the slurry was then used in the preparation of polyester in order to obtain the same containing 107 to 856 ppm of the antimony component as shown in Table 1.

The results of the polycondensation reaction time corresponding to the each content of the polycondensation catalyst and the physical properties of the resulting polyester are set forth in Table 1.

COMPARATIVE EXAMPLES 2 to 6

The same procedure as described in the step (B) of Examples 1 to 4 and Comparative Example 1 was repeated with the exception that the predetermined amount of the antimony trioxide as the polycondensation catalyst was dispersed in 5% by weight in ethylene glycol, and the slurry was then used in the preparation of polyester in order to obtain the same containing 92 to 735 ppm of the antimony component as shown in Table 1.

The results of the polycondensation reaction time corresponding to the each content of the polycondensation catalyst and the physical properties of the resulting polyester are set forth in Table 1.

EXAMPLE 9 AND COMPARATIVE EXAMPLES 7 and 8

A. Preparation of polycondensation catalyst

The same procedure as was set forth in the step (A) of Examples 1 to 4 and Comparative Example 1 was followed in the preparation of the polymerization catalyst except for the use of 161.4 parts(0.84 mol) of trimellitic anhydride, 540 parts of methanol, 70.5 parts(1.68 mol) of lithium hydroxide and a solution in which 63.9 parts(0.28 mol) of antimony trichloride was dissolved in 170 parts of methanol.

According to the infrared spectrum, have the absorption peak due to the methyl ester group of the obtained product was observed in 1,710 cm$^{-1}$. By the element analysis it was found that the content of antimony and lithium was 27.06% and 2.05% by weight, respectively.

B. Preparation of Polyester

The same procedure as described in the step (B) of Examples 1 to 4 and Comparative Example 1 was repeated except for the use of a slurry in which the predetermined amount of the polycondensation catalyst obtained from the step (A) was dispersed in 5% by weight in ethylene glycol to prepare the resulting polyester containing 178 ppm of antimony component and a solution in which the predetermined amount of the above-mentioned catalyst was dispersed in 10% by weight in ethylene glycol to prepare the resulting polyester containing 121, 148 or 165 ppm of phosphorus component as shown in Table 2.

The results of the polycondensation reaction time corresponding to the each content of the phosphorus and the physical properties of the resulting polyester are set forth in Table 2.

COMPARATIVE EXAMPLE 9 to 11

The same procedure as described in the step (B) of Examples 1 to 4 and Comparative Example 1 was repeated with the exception that the polycondensation catalyst obtained from the step (A) of Example 9 and Comparative Examples 7 and 8 was added to the procedure. Each comparative example is compared with a period of time for introducing trimethylphosphate, as shown in Table 3, to prepare the resulting polyester containing 178 ppm of antimony component.

The results of the polycondensation reaction time corresponding to the period of time for introducing the catalyst and the physical properties of the resulting polyester are set forth in Table 3.

COMPARATIVE EXAMPLE 12

The same procedure as described in the step (B) of Examples 1 to 4 and Comparative Example 1 was repeated with the exception that each of the polycondensation catalyst obtained from the step (A) of Example 9 and Comparative Examples 7 and 8 and an antimony trioxide catalyst was taken a equal amount based on the content of antimony component, followed by adding therein, so that the content of antimony in the resulting polyester was 178 ppm by the sum of the content of the each catalysts.

The results of polycondensation reaction time and physical properties of the resulting polyester are set forth in Table 4.

EXAMPLE 10

A reaction vessel fitted with a stirrer and a rectifying column was charged with the esterified product (the rate of esterfication was 97% by tool based on terephthalic acid) obtained by direct esterification reaction of terephthalic acid with ethylene glycol and a slurry comprising 556 parts of terephthalic acid and 250 parts of ethylene glycol.

After the reactant thus obtained was heated under 3 kg/cm$^2$ of pressure, raising the temperature up to 240° C. for 90 minutes, and this temperature was then maintained for further 60 minutes, while removing water formed from in the reaction vessel to complete the esterification reaction.

Afterward, the pressure of the reaction vessel was slowly reduced to a level of ambient pressure for 60 minutes while the temperature was maintained at 240°, followed by adding a solution of 5.36 parts of trimethylphosphate dissolved in 10% by weight in ethylene glycol and a solution of the predetermined amount of polycondensation catalyst obtained from the step (A) of Examples 1 to 4 and Comparative Example 1 dissolved in 5% by weight in ethylene glycol to prepare the resulting polyester containing 143 ppm of antimony component simultaneously, and stirring was then continued for further 10 minutes. Next, the reaction temperature was finally raised up to 285° C., while reducing the pressure slowly for 60 minutes to a level of 0.8 to 0.9 Torr.

The polycondensation reaction was continued under the high vacuum, and when the viscosity of the reaction mixture was reached at any desired level, the reaction was completed. Next, the reaction mixture was extruded into a cooling water through nozzle which was placed at the bottom of reaction vessel to form a spaghetti structure, followed by cutting it into a regular size, whereby the resulting polymer was obtained in the form of chip.

The results of the polymerization reaction time and the physical properties of the resulting polyester are set forth in Table 4.

EXAMPLE 11

The same procedure as described in Example 10 was repeated with the exception that the polycondensation catalyst obtained from the step (A) of Example 5 to 8 was dispersed in 5% by weight in ethylene glycol to prepare a slurry, and this slurry was used in the preparation of polyester in order to obtain the same containing 321 ppm of antimony component.

The results of the polymerization reaction time and the physical properties of the resulting polyester are set forth in Table 4.

COMPARATIVE EXAMPLE 13

The same procedure as described in Example 10 was repeated with the exception that antimony trioxide was dispersed in 5% by weight of ethylene glycol, and this slurry was used in the preparation of polyester in order to obtain the same containing 367 ppm of antimony component.

The results of the polymerization reaction time and the physical properties of the resulting polyester are set forth in Table 4.

EXAMPLES 12 to 15

A. Preparation of Polycondensation Catalyst

Into a round-bottomed flask were added 19.2 parts(0.1 mol) of trimellitic anhydride and 100 parts of ethylene glycol, and refluxed the reaction mixture by heating up to a boiling point of ethylene glycol, followed by stirring for an hour and thirty minutes. Then the mixture was allowed to cool to a room temperature, following which 8.4 parts(0.2 mol) of lithium hydroxide was added, and stirring was continued further for about 30 minutes on a water bath.

Introducing into the reaction mixture a solution which was prepared separately by dissolving 7.5 parts(0.033 mol) of antimony chloride in 20 parts of methanol at a room temperature, a precipitate occurred on the bottom of flask. The reaction mixture was further stirred for about 30 minutes, followed by pouring it into the excess of acetone. Next, the reaction mixture thus obtained was stayed overnight, and the precipitated antimony compound was filtered from the mother liquor.

Afterward, the solid reaction product obtained above was washed with acetone once more, and dried overnight in an vacuum oven at 68° C. under a reduced pressure.

According to the infrared spectrum, an absorption peak due to β-hydroxyethyl ester group was observed in 1708 $cm^{-1}$. By the element analysis, it was found that the content of antimony and lithium were 38.22 and 1.02% by weight, respectively.

B. Preparation of Polyester

The same procedure as described in the step (B) of Examples 1 to 4 and Comparative Example 1 was repeated with the exception that the catalyst obtained from the step (A) as polycondensation catalyst was dispersed in 5% by weight in ethylene glycol, and this slurry was used in the preparation of polyester in order to obtain the same containing 84 to 669 ppm of antimony component.

The results of the polymerization reaction time corresponding to the each content of the polycondensation catalyst and the physical properties of the resulting polyester are set forth in Table 5.

EXAMPLE 16 to 19

A. Preparation of Polycondensation Catalyst

The procedure as was set forth in the step (A) of Examples 12 to 15 was followed in the preparation of the polymerization catalyst except for the use of a solution in which 15.3 parts(0.067 mol) of antimony trichloride was dissolved in 40 parts of methanol.

According to the infrared spectrum, the absorption peak due to β-hydroxyethyl ester group was observed in 1710 $cm^{-1}$. By the element analysis, it was found that the content of antimony and lithium was 57.69% and 2,870 ppm by weight, respectively.

B. Preparation of Polyester

The same procedure as described in the step (B) of Examples 1 to 4 was repeated except for the use of a solution in which the predetermined amount of polycondensation catalyst obtained from the step (A) was dispersed in the form of slurry in 5% by weight in ethylene glycol to prepare the resulting polyester containing 126 to 1,010 ppm of antimony component.

The results of the polycondensation reaction time corresponding to the each content of the catalyst and the physical properties of the resulting polyester are set forth in Table 5.

COMPARATIVE EXAMPLE 14

The same procedure as described in the step (B) of Examples 1 to 4 and Comparative Example 1 was repeated with the exception that each of the polycondensation catalyst obtained from the step (A) of Example 1 to 4 and antimony trioxide catalyst was taken in a equal amount on the basis of the content of antimony component.

The total amount of the antimony component provided from each catalyst in the resulting polyester is as shown in Table 5. The results of the physical properties are set forth in Table 5.

EXAMPLE 20

The same procedure as described in Example 10 was followed except for the use of the catalyst obtained from Examples 12 to 15 as polycondensation catalyst.

In this case, the results of the polymerization time and the physical properties of the resulting polyester are set forth in Table 5.

EXAMPLE 21

The same procedure as described in Example 10 was repeated with the exception that the polycondensation catalyst obtained from the step (A) of Examples 16 to 19 was dispersed in 5% by weight in ethylene glycol, and this slurry was used in the preparation of polyester in order to obtain the same containing 379 ppm of antimony component.

The results of the polycondensation reaction time and the physical properties of the resulting polyester are set forth in Table 5.

COMPARATIVE EXAMPLE 15

The same procedure as described in Example 10 was repeated with the exception that antimony trioxide was dispersed in 5% by weight in ethylene glycol, and this slurry was used in the preparation of polyester in order to obtain the same containing 370 ppm of antimony component.

The results of the polycondensation reaction time and the physical properties of the resulting polyester are set forth in Table 5.

TABLE 1

|  | the content of antimony (ppm) | reaction time (min.) | [η] (dl/g) | melting point (°C.) | COOH (equivalent/ton) | DEG (% by weight) | L value | b value |
|---|---|---|---|---|---|---|---|---|
| Example 1 | 380 | 40 | 0.502 | 255.1 | 9.5 | 0.59 | 69.1 | 1.0 |
| Example 2 | 190 | 55 | 0.498 | 255.3 | 13.4 | 0.71 | 65.8 | 0.8 |
| Example 3 | 143 | 58 | 0.561 | 253.5 | 14.6 | 0.86 | 69.1 | 1.2 |
| Example 4 | 95 | 72 | 0.496 | 254.7 | 19.0 | 0.92 | 67.8 | 0.9 |
| Example 5 | 856 | 30 | 0.544 | 253.4 | 11.6 | 0.81 | 62.2 | 1.0 |
| Example 6 | 428 | 44 | 0.517 | 253.8 | 14.3 | 0.87 | 63.3 | 1.2 |
| Example 7 | 214 | 55 | 0.503 | 254.1 | 17.7 | 0.96 | 67.4 | 1.4 |
| Example 8 | 107 | 63 | 0.497 | 254.5 | 19.4 | 0.94 | 69.1 | 1.1 |
| Comparative Example 1 | 48 | 135 | 0.411 | 257.5 | — | — | — | — |
| Comparative Example 2 | 735 | 42 | 0.531 | 252.9 | 15.4 | 1.05 | 62.8 | 0.6 |
| Comparative Example 3 | 367 | 47 | 0.534 | 253.2 | 17.1 | 1.06 | 64.4 | 0.3 |
| Comparative Example 4 | 276 | 53 | 0.526 | 253.1 | 19.1 | 0.78 | 64.9 | 0.6 |
| Comparative Example 5 | 184 | 68 | 0.560 | 251.3 | 21.9 | 0.98 | 65.6 | 1.3 |
| Comparative Example 6 | 92 | 115 | 0.528 | 252.3 | 25.5 | 1.03 | 67.2 | 2.5 |

TABLE 2

|  | the content of phosphorus (ppm) | reaction time (min.) | [η] (dl/g) | melting point (°C.) | COOH (equivalent/ton) | DEG (% by weight) | L value | b value |
|---|---|---|---|---|---|---|---|---|
| Example 9 | 148 | 60 | 0.537 | 254.3 | 15.9 | 0.65 | 69.6 | 0.5 |
| Comparative Example 7 | 121 | 58 | 0.544 | 255.3 | 14.4 | 0.76 | 68.1 | 1.3 |
| Comparative Example 8 | 165 | 61 | 0.529 | 254.9 | 11.8 | 0.81 | 69.1 | 0.8 |

TABLE 3

|  | the point of time for introducing polycondensation catalyst | reaction time (min.) | [η] (dl/g) | melting point (°C.) | COOH (equivalent/ton) | DEG (% by weight) | L value | b value |
|---|---|---|---|---|---|---|---|---|
| Comparative Example 9 | die same time | 57 | 0.561 | 253.9 | 15.4 | 0.81 | 70.9 | 1.0 |
| Comparative Example 10 | after 7 min. | 60 | 0.537 | 253.9 | 13.5 | 0.66 | 69.6 | 0.6 |
| Comparative Example 11 | after 20 min. | 60 | 0.535 | 255.4 | 12.4 | 0.65 | 70.2 | 0.6 |

TABLE 4

|  | reaction time (min.) | [η] (dl/g) | melting point (°C.) | COOH (equivalent/ton) | DEG (% by weight) | L value | b value |
|---|---|---|---|---|---|---|---|
| Example 10 | 45 | 0.552 | 248.1 | 8.6 | 3.13 | 71.0 | 2.8 |
| Example 11 | 45 | 0.564 | 248.6 | 8.0 | 2.89 | 69.5 | 2.4 |
| Comparative Example 12 | 63 | 0.542 | 253.8 | 17.3 | 0.85 | 68.3 | 0.9 |
| Comparative Example 13 | 50 | 0.560 | 247.0 | 11.2 | 3.65 | 67.8 | 2.8 |

TABLE 5

| | the content of antimony (ppm) | reaction time (min.) | [η] (dl/g) | melting point (°C.) | COOH (equivalent/ton) | DEG (% by weight) | L value | b value |
|---|---|---|---|---|---|---|---|---|
| Example 12 | 669 | 30 | 0.537 | 253.3 | 15.1 | 0.83 | 62.6 | 0.8 |
| Example 13 | 335 | 35 | 0.554 | 253.6 | 15.8 | 0.94 | 63.8 | 0.4 |
| Example 14 | 167 | 45 | 0.556 | 253.5 | 16.2 | 1.00 | 67.0 | 0.5 |
| Example 15 | 84 | 55 | 0.581 | 253.5 | 21.6 | 1.10 | 68.8 | 1.1 |
| Example 16 | 1010 | 30 | 0.553 | 251.9 | 21.3 | 1.31 | 61.3 | 1.5 |
| Example 17 | 505 | 37 | 0.537 | 253.1 | 17.0 | 0.95 | 64.9 | 0.6 |
| Example 18 | 253 | 55 | 0.581 | 253.8 | 21.6 | 1.13 | 68.8 | 1.0 |
| Example 19 | 126 | 75 | 0.538 | 254.9 | 29.8 | 1.08 | 72.1 | 2.2 |
| Comparative Example 14 | 167 | 51 | 0.522 | 253.3 | 17.8 | 1.01 | 68.0 | 0.9 |
| Example 20 | 251 | 50 | 0.545 | 247.5 | 7.8 | 3.50 | 69.3 | 2.3 |
| Example 21 | 379 | 45 | 0.590 | 247.4 | 10.2 | 3.28 | 66.5 | 2.7 |
| Comparative Example 15 | 370 | 50 | 0.567 | 247.0 | 11.0 | 3.70 | 67.8 | 2.9 |

The invention has been described in detail with particular reference to preferred embodiments thereof, but it will be understood that variations and modifications can be effected within the spirit and scope of the invention.

What is claimed is:

1. A process for preparing a linear polyester, comprising the step of:

polycondensing bis(β-hydroxyethyl) terephthalate or a condensate thereof having a polymerization degree of 2–10 in the presence of a polycondensation catalyst obtained by reacting an antimony compound with an esterified trimellitate in a molar ratio of antimony compound to trimellitate of 0.25–1:1, said esterified trimellitate having formula (A):

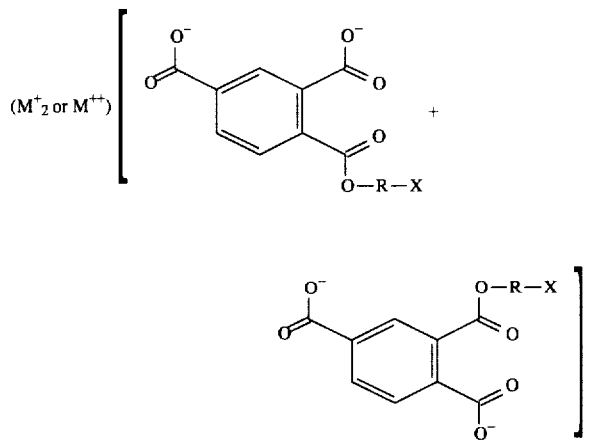

(A)

wherein $M^+$ is an alkali metal cation or organic amine cation;

$M^{++}$ is an alkaline earth metal cation;

R is an alkylene or arylene group having 1–18 carbon atoms;

X is H or OH; and wherein said polycondensation catalyst contains 50–1,500 ppm antimony based on said linear polyester.

2. The process of claim 1, further comprising preparing said esterified trimellitate by reacting a trimellitic acid or trimellitic anhydride with an alcohol or glycol to obtain an esterified trimellitic acid, and reacting said esterified trimellitic acid with an organic amine, alkali metal hydroxide or alkaline earth metal hydroxide.

3. The process of claim 2, wherein said trimellitic acid or trimellitic anhydride is reacted with an alcohol selected from the group consisting of methanol and ethanol.

4. The process of claim 2, wherein said trimellitic acid or trimellitic anhydride is reacted with a glycol selected from the group consisting of polyalkylene glycols having 2–18 carbon atoms.

5. The process of claim 4, wherein said glycol is ethylene glycol.

6. The process of claim 1, wherein said antimony compound is selected from the group consisting of antimony halides, antimony carboxylates and antimony alkoxides.

7. The process of claim 6, wherein said antimony compound is an antimony halide selected from the group consisting of antimony trichloride and antimony tribromide.

8. The process of claim 1, wherein said polycondensation catalyst contains 80–1,000 ppm antimony based on the linear polyester.

9. The process of claim 1, wherein said molar ratio of antimony compound to trimellitate is 0.3–0.7:1.

10. The process of claim 1, further comprising producing said bis(β-hydroxyethyl) terephthalate or said condensate thereof by heating dialkyl terephthalate with ethylene glycol at a temperature of 130°–250° C. in the presence of an ester-exchange catalyst for about 1–4 hours under atmospheric pressure.

11. The process of claim 1, further comprising forming said bis(β-hydroxyethyl) terephthalate or said condensate thereof by heating terephthalic acid and ethylene glycol at a temperature of 200°–280° C. for about 1–4 hours.

12. The process of claim 10, wherein said polycondensing step is conducted at a temperature of 260°–300° C. for 1–5 hours at a pressure of 0.1–30 Torr.

13. A polycondensation catalyst obtained by reacting: an antimony compound having formula (I):

(I)

wherein X is selected from the group consisting of halides, carboxylates and alkoxides; with an esterified trimellitate having formula (A):

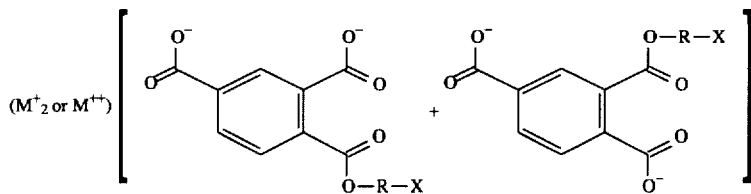 (A)

M⁺ is an alkali metal cation or organic amine cation;

M⁺⁺ is an alkaline earth metal cation;

R is an alkylene or arylene group having 1-18 carbon atoms;

X is H or OH;

wherein the molar ratio of said antimony compound to said trimellitate is 0.25–1:1.

14. The catalyst of claim 13, wherein said molar ratio is 0.3–0.7:1.

15. The catalyst of claim 13, wherein said antimony compound is selected from the group consisting of antimony trichloride, antimony tribromide, antimony trifluoride, antimony triacetate, antimony tristearate, antimony tribenzoate, antimony tri(2-ethylhexenoate), antimony trioctoate, antimony trimethoxide, antimony ethylene glycoxide, antimony triisopropoxide, antimony tri (n-butoxide) and antimony triphenoxide.

* * * * *